United States Patent
Hibiya et al.

(10) Patent No.: US 9,946,063 B2
(45) Date of Patent: Apr. 17, 2018

(54) LIGHT SCANNING APPARATUS, LIGHT SCANNING CONTROL APPARATUS, AND LIGHT SCANNING UNIT

(71) Applicants: Riichiro Hibiya, Tokyo (JP); Hisamichi Sekine, Tokyo (JP)

(72) Inventors: Riichiro Hibiya, Tokyo (JP); Hisamichi Sekine, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/283,384

(22) Filed: May 21, 2014

(65) Prior Publication Data

US 2014/0355087 A1 Dec. 4, 2014

(30) Foreign Application Priority Data

Jun. 3, 2013 (JP) .................................. 2013-116689

(51) Int. Cl.
*G02B 26/08* (2006.01)
*G02B 26/10* (2006.01)

(52) U.S. Cl.
CPC .................................. *G02B 26/105* (2013.01)

(58) Field of Classification Search
CPC ............................. G02B 26/105; G02B 26/101; G02B 26/0833; G02B 7/1821; G02B 26/0841;

(Continued)

(56) References Cited

U.S. PATENT DOCUMENTS 5,642,275 A * 6/1997 Peng ........................ H02M 7/49
363/137
8,841,821 B2 * 9/2014 Aimono ........................ 310/332

(Continued)

FOREIGN PATENT DOCUMENTS

CN 102692704 9/2012
JP 2012-208352 10/2012

OTHER PUBLICATIONS

Piezoelectricity https://www.americanpiezo.com/knowledge-center/piezo-theory/piezoelectricity.html Jan. 14, 2016.*

(Continued)

*Primary Examiner* — Bumsuk Won
*Assistant Examiner* — Henry Duong
(74) *Attorney, Agent, or Firm* — IPUSA, PLLC

(57) ABSTRACT

A light scanning apparatus includes torsion beams supporting a mirror supporting portion on opposite sides of the mirror supporting portion along an axis direction, the mirror supporting portion being swung around the axis direction by the torsion beams; a pair of drive beams sandwiching the mirror and the mirror supporting portion in a direction orthogonal to the axis direction; connection beams that connect mutually facing sides of each drive beam with the torsion beams; and a piezoelectric sensor formed on the connection beams and detecting displacement of the connection beams caused by a swing of the torsion beams around the axis when the mirror swings by a drive voltage, wherein a first bias voltage having a positive or negative polarity is applied to an upper electrode of the piezoelectric sensor, and a second bias voltage having an opposite polarity is applied to a lower electrode.

12 Claims, 12 Drawing Sheets

(58) Field of Classification Search
CPC . G02B 26/08; G02B 26/0816; G02B 26/0825
USPC .. 359/199.1–199.4, 212.1–214.1, 223.1–226
See application file for complete search history.

(56) References Cited

U.S. PATENT DOCUMENTS

| | | | |
|---|---|---|---|
| 2003/0107789 A1* | 6/2003 | Hishioka | G02B 3/14 |
| | | | 359/223.1 |
| 2009/0180167 A1* | 7/2009 | Tani | G02B 26/0858 |
| | | | 359/198.1 |
| 2010/0142018 A1* | 6/2010 | Shin | 359/199.3 |
| 2010/0309536 A1* | 12/2010 | Akanuma | G02B 26/0858 |
| | | | 359/200.8 |
| 2012/0242191 A1 | 9/2012 | Aimono | |
| 2012/0250127 A1 | 10/2012 | Naono | |
| 2015/0036201 A1* | 2/2015 | Horie | G02B 26/0858 |
| | | | 359/198.1 |
| 2016/0356984 A1* | 12/2016 | Horie | G02B 26/0858 |

OTHER PUBLICATIONS

Piezoelectricity https://www.americanpiezo.com/knowledge-center/piezo-theory/piezoelectricity.html Jan. 14, 2012.*
Chinese Office Action for 201410242735.5 dated Jun. 26, 2017.

* cited by examiner

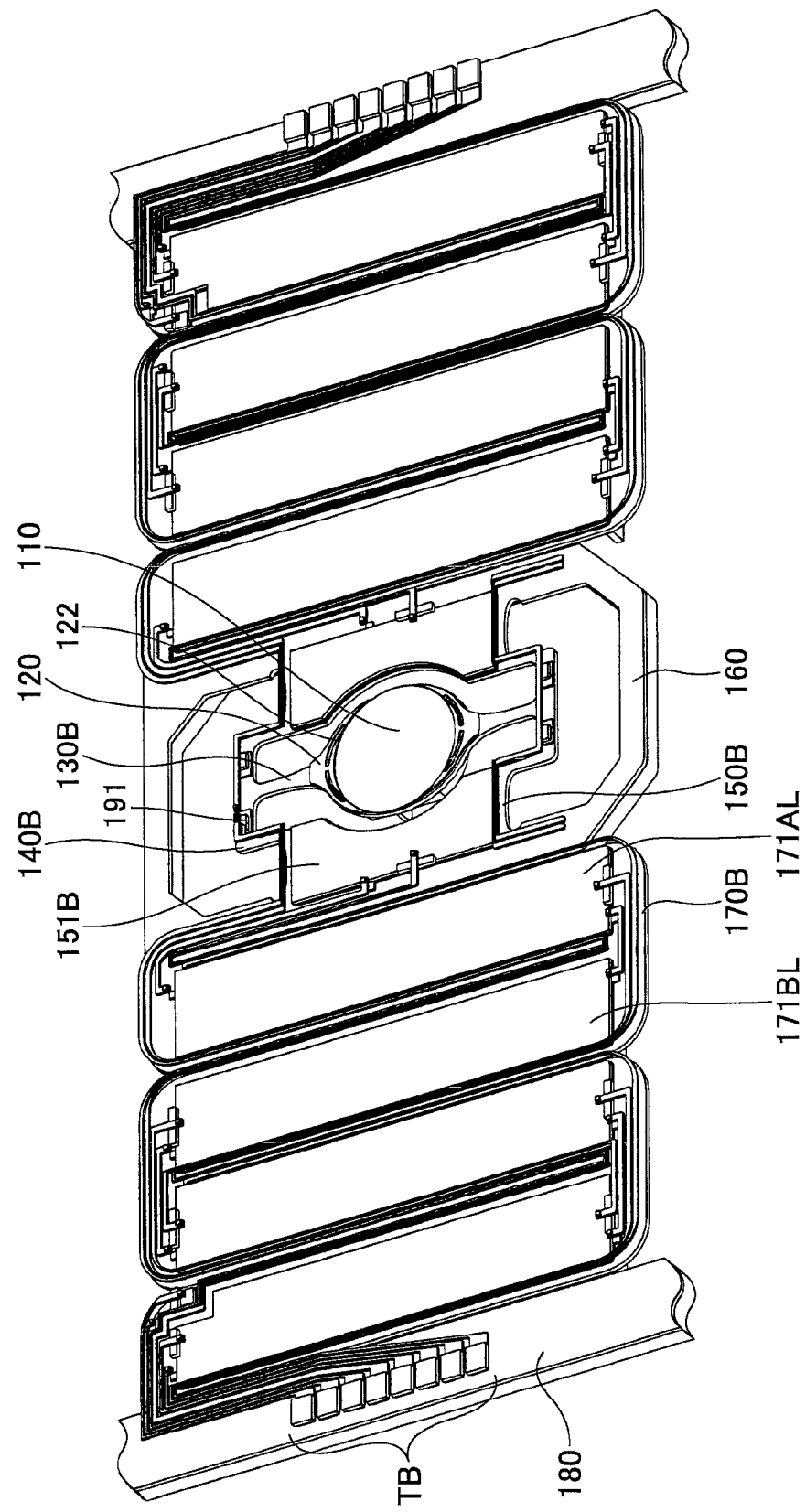

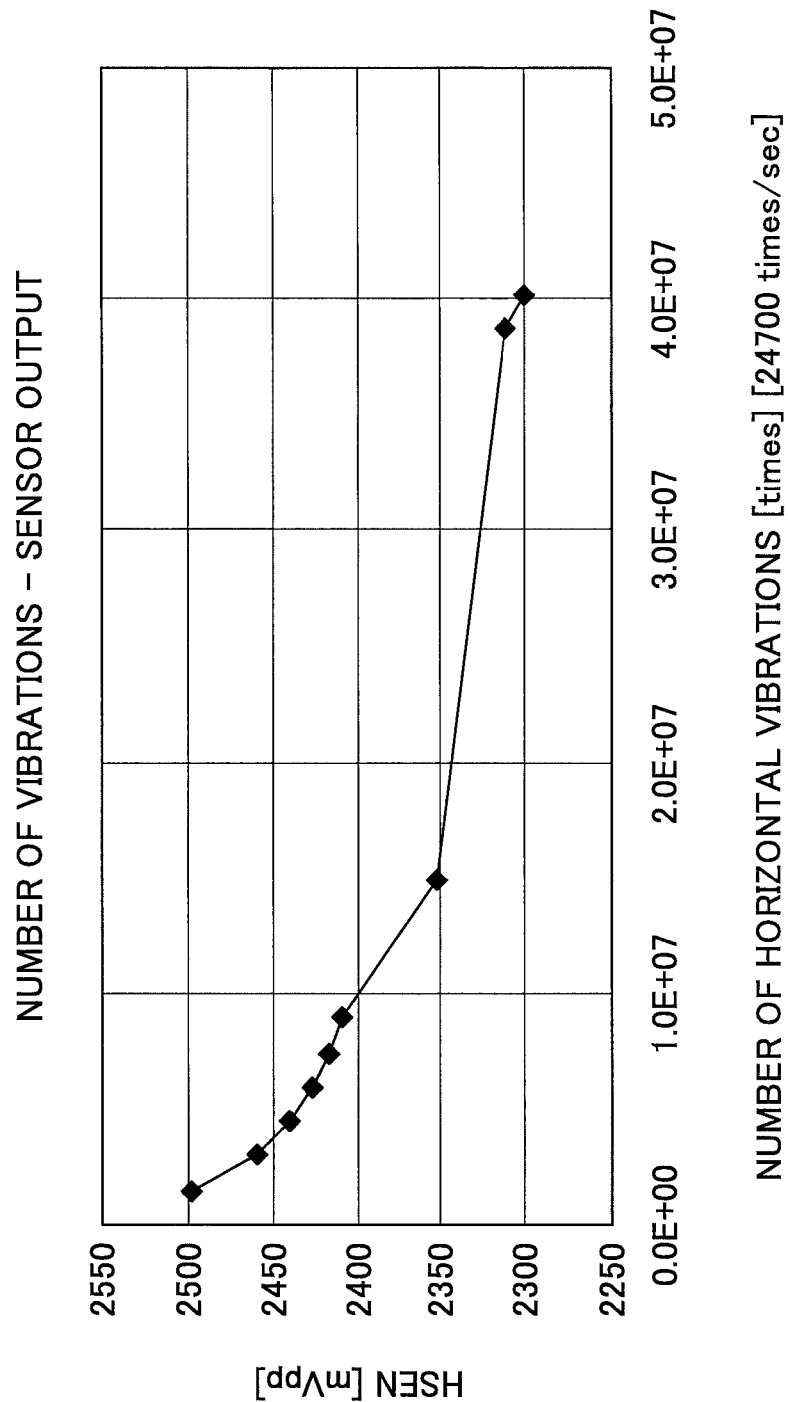

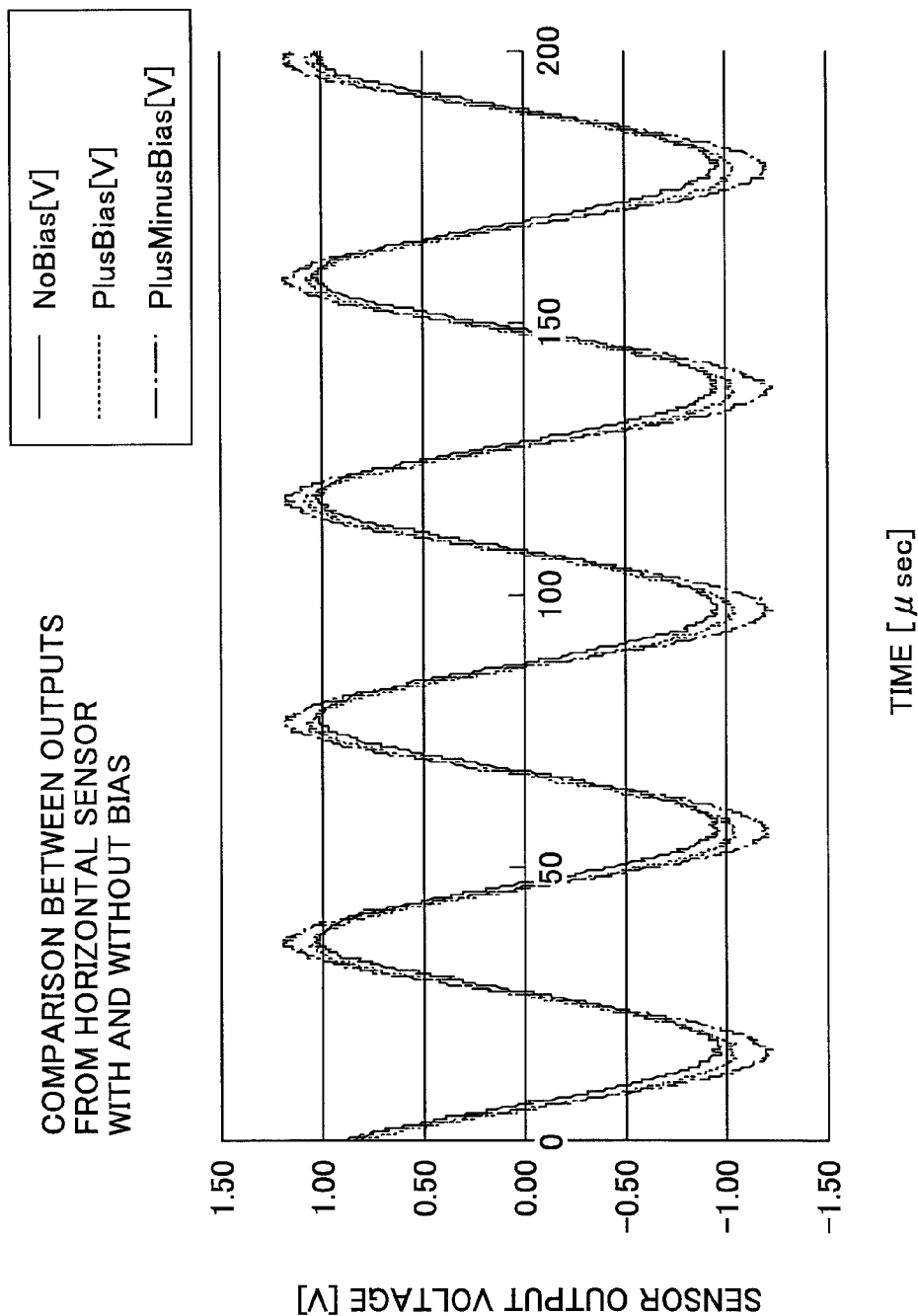

LIGHT SCANNING APPARATUS, LIGHT SCANNING CONTROL APPARATUS, AND LIGHT SCANNING UNIT

CROSS-REFERENCE TO RELATED APPLICATIONS

This patent application is based upon and claims the benefit of priority of Japanese Patent Application No. 2013-116689 filed on Jun. 3, 2013, the entire contents of which are incorporated herein by reference.

BACKGROUND OF THE INVENTION

1. Field of the Invention

The embodiments of the present invention relate to a light scanning apparatus that causes a mirror supporting portion, which is supports a mirror and is supported by a torsion beam on both sides of an axis, to swing in directions around the axis by torsion of the torsion beam, a light scanning control apparatus for controlling the light scanning apparatus, and a light scanning unit including the light scanning apparatus and the light scanning control apparatus.

2. Description of the Related Art

In an example of a light scanning apparatus disclosed in, for example, Japanese Laid-open Patent Publication No. 2012-208352, a mirror portion for reflecting an incident light is rotated around a rotational axis using an actuator that is formed by providing an upper electrode on the upper surface of the piezoelectric element and by providing a lower electrode on the lower surface of the piezoelectric element. In this actuator, by applying a drive voltage to the upper electrode and the lower electrode, the mirror portion is swung in a vertical direction and a horizontal direction relative to a reflection surface.

Movement of this actuator is controlled based on a tilt of the mirror portion obtained as an output of a piezoelectric sensor that is provided to the actuator and detects a voltage generated in a piezoelectric element while the mirror portion is driven and swung.

For example, the piezoelectric sensor has a structure similar to an actuator using a piezoelectric element and outputs a voltage corresponding to displacement of the mirror. One of an upper electrode and a lower electrode of this piezoelectric sensor may be grounded, and the other one of the upper electrode and the lower electrode may be connected to an output terminal of the piezoelectric sensor.

SUMMARY OF THE INVENTION

FIG. 1 illustrates a connection of an exemplary piezoelectric sensor. One electrode of the exemplary piezoelectric sensor 10 is grounded, and the other electrode of the exemplary piezoelectric sensor 10 is connected with an output terminal. A resistor R1 is connected with the other terminal of the exemplary piezoelectric sensor 10 to prevent charge-up from occurring.

In the exemplary piezoelectric sensor, a great drop of the output voltage is possibly caused by aging degradation to thereby make sensitivity to the displacement of the mirror unresponsive with passage of time. Further, because an original output voltage is originally small in the exemplary piezoelectric sensor, the exemplary piezoelectric sensor is apt to suffer from a noise.

Embodiments of the present invention are provided to solve problems in consideration of the above situation. The objects of the embodiments are to provide a light scanning apparatus that can suppress a drop of an output voltage by aging degradation of the piezoelectric sensor and an influence of the noise, a light scanning control apparatus, and a light scanning unit.

According to a first aspect of the present invention, there is provided a light scanning apparatus including a mirror; a mirror supporting portion that supports the mirror; torsion beams that support the mirror supporting portion on opposite sides of the mirror supporting portion along an axis direction of an axis, the mirror supporting portion being swung around the axis direction by torsion of the torsion beams; a pair of drive beams that sandwich the mirror and the mirror supporting portion in a direction orthogonal to the axis direction; connection beams that connect mutually facing sides of each of drive beams with the torsion beams; and a piezoelectric sensor that is formed on the connection beams and detects displacement of the connection beams caused by a swing of the torsion beams around the axis when the mirror swings by a drive voltage applied to the drive beams, wherein a first bias voltage having a positive or negative polarity is applied to an upper electrode of the piezoelectric sensor, and a second bias voltage having a polarity opposite to the polarity of the first bias voltage is applied to a lower electrode of the piezoelectric sensor.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 3B illustrates the light scanning apparatus of the first embodiment of the present invention;

FIG. 7A illustrates aging degradation of a piezoelectric sensor;

FIG. 8 illustrates sensor signals in a case where a bias voltage is applied and a case where the bias voltage is not applied;

DETAILED DESCRIPTION OF THE PREFERRED EMBODIMENTS

A description is given below, with reference to the FIG. 2 through FIG. 10 of embodiments of the present invention. Where the same reference symbols are attached to the same parts, repeated description of the parts is omitted.

Reference symbols typically designate as follows:
100, 100A, 100B: light scanning unit;
110: mirror;
191, 195, 196: piezoelectric sensor;
200: light scanning apparatus;
300: voltage generation circuit;
400: front end IC;
500, 500A, 500B: mirror driver IC; and
550, 570: buffer.

First Embodiment

Figure 1:
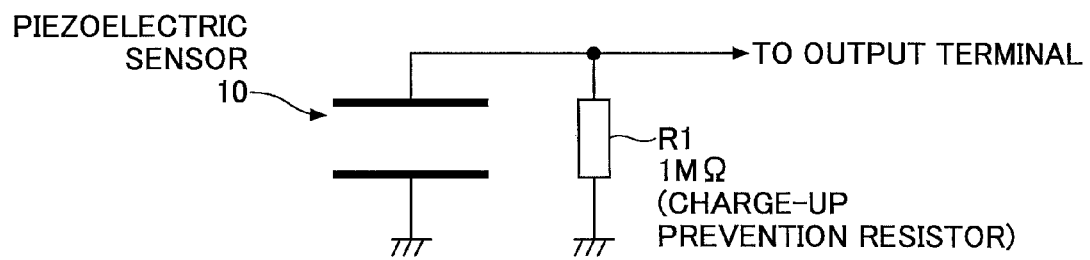
FIG. 1 illustrates a connection of an exemplary piezoelectric sensor.
Figure 2:
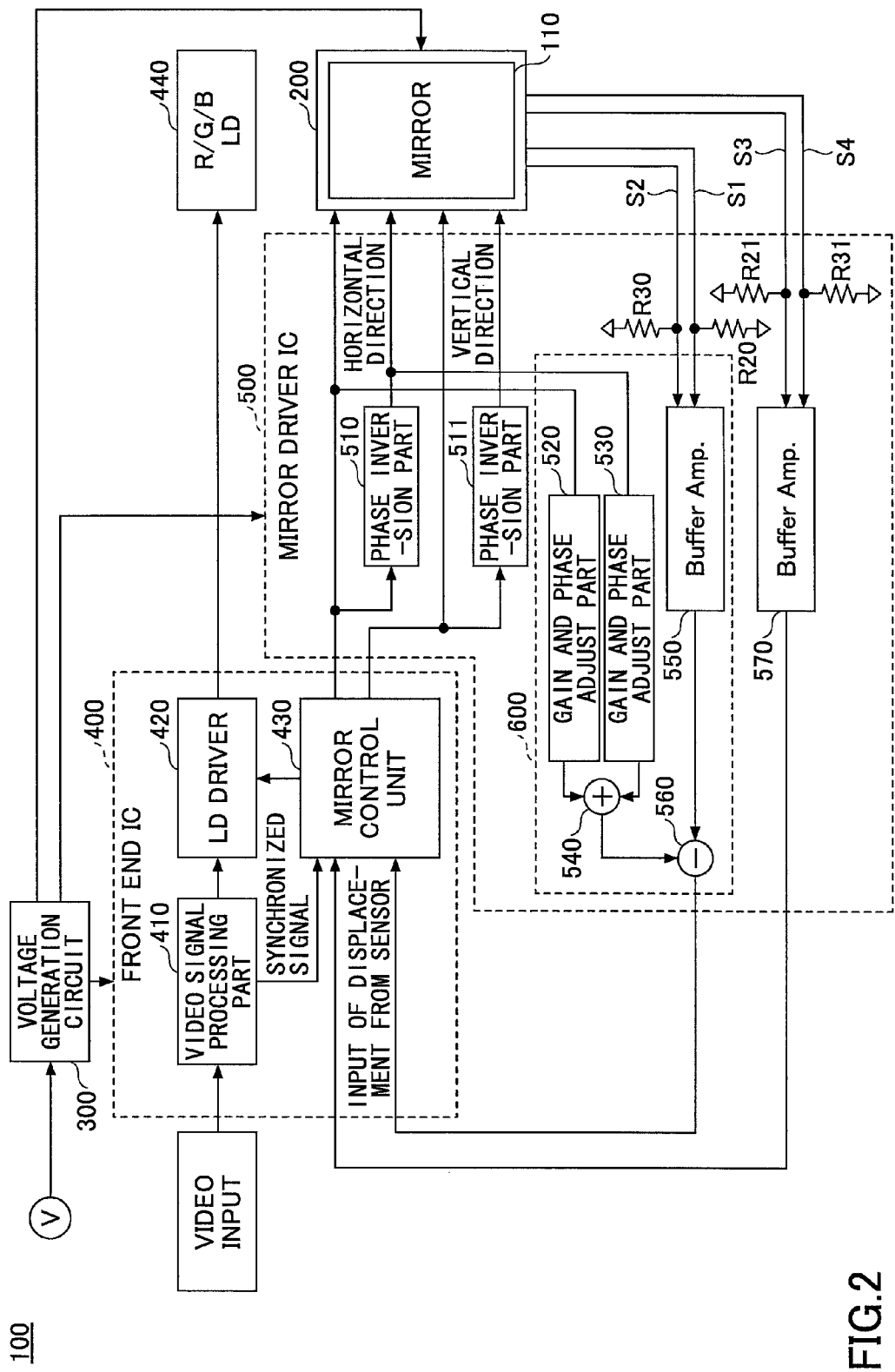
FIG. 2 illustrates a light scanning unit of a first embodiment of the present invention.

FIG. 2 illustrates a light scanning unit of a first embodiment of the present invention.

The light scanning unit 100 of the first embodiment includes a light scanning apparatus 200, a voltage generation circuit 300, a front end integrated circuit (IC) 400, a laser diode (LD) 440, a mirror driver IC 500, and resistors R20, R21, R30, and R31.

The light scanning apparatus 200 of the embodiment is a light scanning apparatus 200 causing a light emitted from the LD 440 to scan. The light scanning apparatus 200 is a micro electro mechanical system (MEMS) mirror or the like where a mirror is driven by, for example, a piezoelectric element or the like.

The light scanning unit 100 of the first embodiment includes a light scanning apparatus 200. The voltage generation circuit 300, the front end integrated circuit (IC) 400, the LD 440, the mirror driver IC 500, and the resistors R20, R21, R30, and R31 form a light scanning control apparatus for controlling the light scanning apparatus 200.

Hereinafter, before describing portions of the light scanning unit 100, the light scanning apparatus 200 of the first embodiment is described.

Figure 3A:
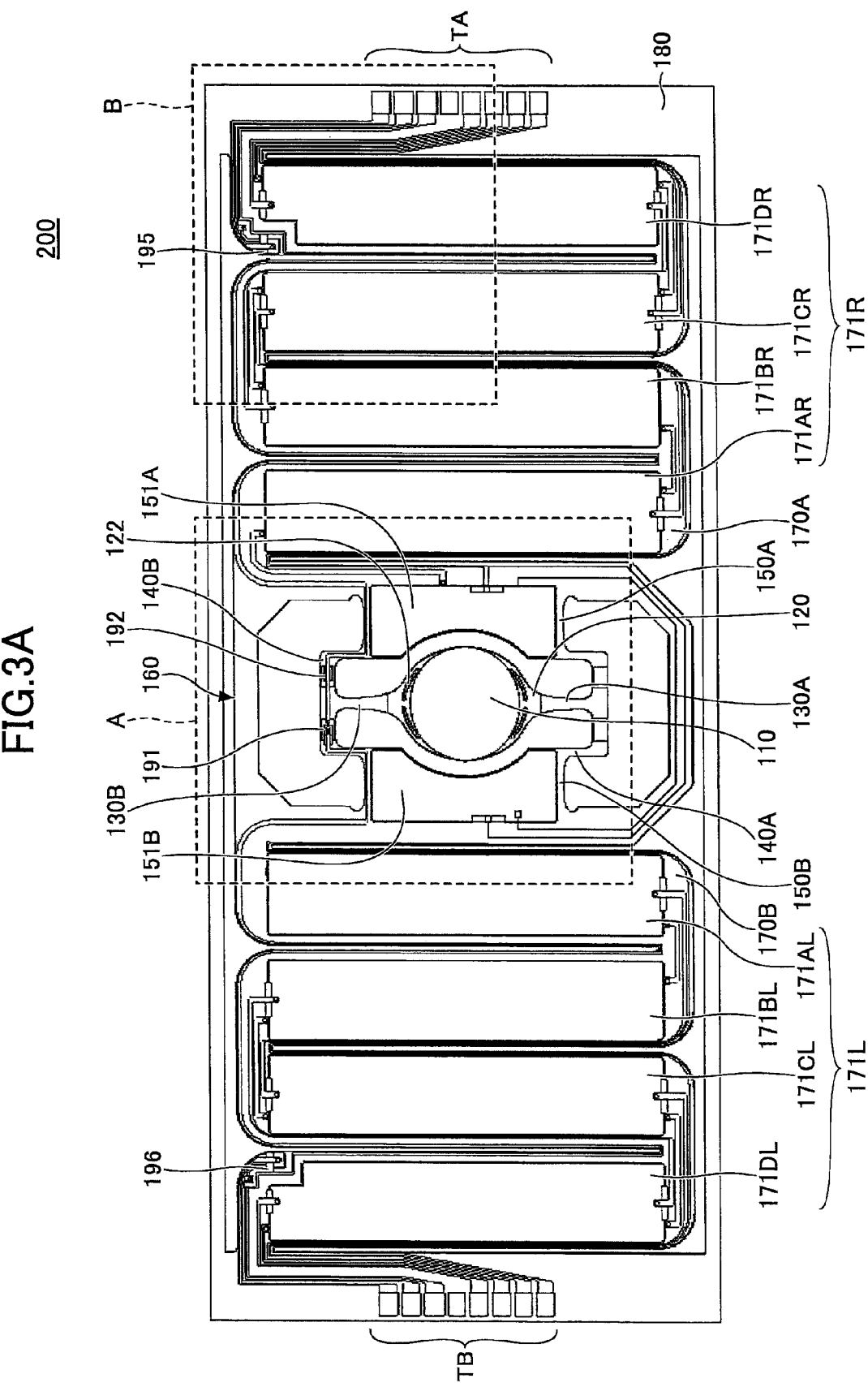
FIG. 3A illustrates a light scanning apparatus of the first embodiment of the present invention.

FIG. 3A is a plan view of the light scanning unit of the first embodiment of the present invention. FIG. 3B is a perspective view of the light scanning unit of the first embodiment of the present invention and a fixed frame (described below) is partly omitted so as to be easily viewable. The light scanning apparatus 200 of the first embodiment includes a mirror 110, a mirror supporting portion 120, torsion beams 130A and 130B, connection beams 140A and 140B, first drive beams 150A and 150B, a movable frame 160, second drive beams 170A and 170B, and a fixed frame 180. Further, the first drive beams 150A and 150B of the first embodiment respectively includes the drive sources 151A and 151B. The second drive beams 170A and 170B respectively include the drive sources 171R and 171L.

A slit 122 is formed along a periphery of the mirror 110. The weight of the mirror supporting portion 120 can be reduced by the slit 122, and simultaneously torsion caused by the torsion beams 130A and 130B can be transferred to the mirror 110.

In the light scanning apparatus 200 of the first embodiment, the mirror 110 is supported on a surface of the mirror supporting portion 120, and the mirror supporting portion 120 is connected with end portions of the torsion beams 130A and 130B that are provided on both sides of the mirror supporting portion 120. The torsion beams 130A and 130B function as a swing axis, extend in a direction of the axis, and support the mirror supporting portion 120 on the both sides of the direction of the axis. When the torsion beams 130A and 130B twist, the mirror 110 supported by the mirror supporting portion 120 swings to cause a reflection light of a light emitted to the mirror 110 to scan. The torsion beams 130A and 130B are connected respectively with the connection beams 140A and 140B and are supported and connected with the first drive beams 150A and 150B.

The first drive beam 150A and 150B, the connection beams 140A and 140B, the torsion beams 130A and 130B, the mirror supporting portion 120, and the mirror 110 are surrounded by the movable frame 160. One side of each first drive beam 150A and 150B is supported by the movable frame 160. The other side of the first drive beam 150A extends onto an inner peripheral side and is connected with the connection beams 140A and 140B. The other side of the first drive beam 150B extends onto the inner peripheral side and is connected with the connection beams 140A and 140B.

The first drive beams 150A and 150B are paired and provided in a direction orthogonal to the torsion beams 130A and 130B so as to interpose the mirror and the mirror supporting portion 120 among the first drive beams 150A and 150B.

The drive sources 151A and 151B are formed on surfaces of the first drive beams 150A and 150B. The drive sources 151A and 151B include an upper electrode that is formed on the upper surface of a piezoelectric element formed on the surfaces of the first drive beams 150A and 150B and a lower electrode formed on the lower surface of the piezoelectric element. The drive sources 151A and 151B extend or contract in response to the polarity of the drive voltage applied to the upper and lower electrodes. Therefore, by alternately applying the drive voltages having different phases to the first drive beams 150A and 150B respectively, the first beams 150A and 150B oscillate vertically in different directions on the right and left sides of the mirror 110, respectively. Thus, the torsion beams 130A and 130B cause the mirror 110 to swing around a swing axis or a rotation axis along the torsion beams 130A and 130B. Hereinafter, the swing direction where the torsion beams 130A and 130B swing is referred to as a horizontal direction. For example, resonant oscillation may be used to drive in the horizontal direction by the first drive beams 150A and 150B and the mirror 110 may be swung at a high speed (rate).

An end of each second drive beam 170A and 170B is connected to an outer portion of the movable frame 160. The second drive beams 170A and 170B are paired and sandwich the movable frame 160 on the right and left sides of the movable frame 160. The second drive beam 170A is formed in a zigzag-like shape as a whole such that parallel beams that extend from the first drive beam 150A in parallel with the first drive beam 150A are connected at end portions of adjacent parallel beams. The other end of the second drive beam 170A is connected with the inside the fixed frame 180. The second drive beam 170B is formed in a zigzag-like shape as a whole such that parallel beams that extend from the first drive beam 150B in parallel with the first drive beam 150A are connected at end portions of adjacent parallel beams. The other end of the second drive beam 170B is connected with the inside the fixed frame 180.

Drive sources 171R and 171L are formed on the surfaces of the second drive beams 170A and 170B, respectively. The drive source 171R includes an upper electrode that is formed on the upper surface of a piezoelectric element formed on the surface of the second drive beam 170A and a lower electrode formed on the lower surface of the piezoelectric element. The drive source 171L includes an upper electrode that is formed on the upper surface of a piezoelectric element formed on the surface of the second drive beam 170B and a lower electrode formed on the lower surface of the piezoelectric element.

By applying drive voltages of different polarities between adjacent rectangular drive sources 171AR and 171BR, 171BR and 171CR, 171CR and 171DR, 171AL and 171BL, 171BL and 171CL, and 171CL and 171DL in the second drive beams 170A and 170B, the adjacent rectangular drive beams are warped in different vertical directions, and a resultant force caused by the rectangular drive beams in the different vertical directions is transferred to the movable frame 160. The second drive beams 170A and 170B cause the mirror 110 to swing in a vertical direction orthogonal to the direction of arranging the parallel beams. For example, non-resonant oscillation may be used to drive in the vertical direction by the second drive beams 170A and 170B.

In a case where the drive source 171L includes drive sources 171DL, 171CL, 171BL, and 171AL in this order from the left side of the fixed frame 180 toward the movable frame 160, and the drive source 171R includes drive sources 171AR, 171BR, 171CR, and 171DR in this order from the movable frame 160 to the right side of the fixed frame 180, a waveform having a phase is applied to the drive sources 171AL, 171AR, 171CL, and 171CR and the waveform having a different phase different from the phase is applied to the drive sources 171CL, 171CR, 171DL, and 171DR thereby swinging the mirror 110 in the vertical directions.

Further, the light scanning apparatus 200 of the first embodiment includes piezoelectric sensors 191 and 192 for detecting a tilt angle of the mirror 110 in the horizontal directions while the mirror 110 swings in the horizontal directions by the drive sources 151A and 151B applied with the drive voltage. The piezoelectric sensors 191 and 192 are provided in the connection beam 140B. Dummy sensors having substantially the same weight and size as those of the piezoelectric sensors 191 and 192 are provided in the connection beam 140A.

Further, the light scanning apparatus 200 of the first embodiment includes piezoelectric sensors 195 and 196 for detecting a tilt angle of the mirror 110 in the vertical directions while the mirror 110 swings in the vertical directions by the drive sources 171R and 171L applied with the drive voltage. The piezoelectric sensor 195 is provided in the second drive beam 170A in the vicinity of the drive source 171DR, and the piezoelectric sensor 196 is provided in the second drive beam 170B in the vicinity of the drive source 171DL.

Further, the piezoelectric sensors 191 and 192 output current values corresponding to the displacement of the connection beam 140B transferred from the torsion beam 130B in conformity with the tilt angle in the horizontal directions of the mirror 110. The piezoelectric sensor 192 may be a dummy, which does not generate the current value as long as inertia moments on the right and left sides of the connection beam 140B are the same.

The piezoelectric sensor 195 outputs a current value corresponding to displacement of the second drive beam 170A at the rectangular drive source 171DR in the vicinity of the piezoelectric sensor 195 in conformity with the tilt angle of the mirror in the vertical direction. The piezoelectric sensor 196 outputs a current value corresponding to displacement of the second drive beam 170B at the rectangular drive source 171DL in the vicinity of the piezoelectric sensor 196 in conformity with the tilt angle of the mirror in the vertical direction.

The tilt angle of the mirror 110 in the horizontal direction is detected using an output of the piezoelectric sensor 191. The tilt angle of the mirror 110 in the vertical direction is detected using outputs of the piezoelectric sensors 195 and 196. A tilt detection unit for detecting the tilt angle of the mirror 110 based on the current value output of the piezoelectric sensor may be provided outside the light scanning apparatus 200. Further, a drive control unit for controlling the drive voltage that is supplied to the drive sources 151A and 151B and the drive sources 171R and 171L based on the detection result obtained by the tilt detection unit may be provided outside the light scanning apparatus 200.

The piezoelectric sensors 191, 192, 195, and 196 include an upper electrode formed on the upper surface of a piezoelectric element and a lower electrode formed on the lower surface of the piezoelectric element. Within the first embodiment, the outputs of the piezoelectric sensors become current values of sensor wires connected with the upper electrodes and the lower electrodes.

Figure 4:
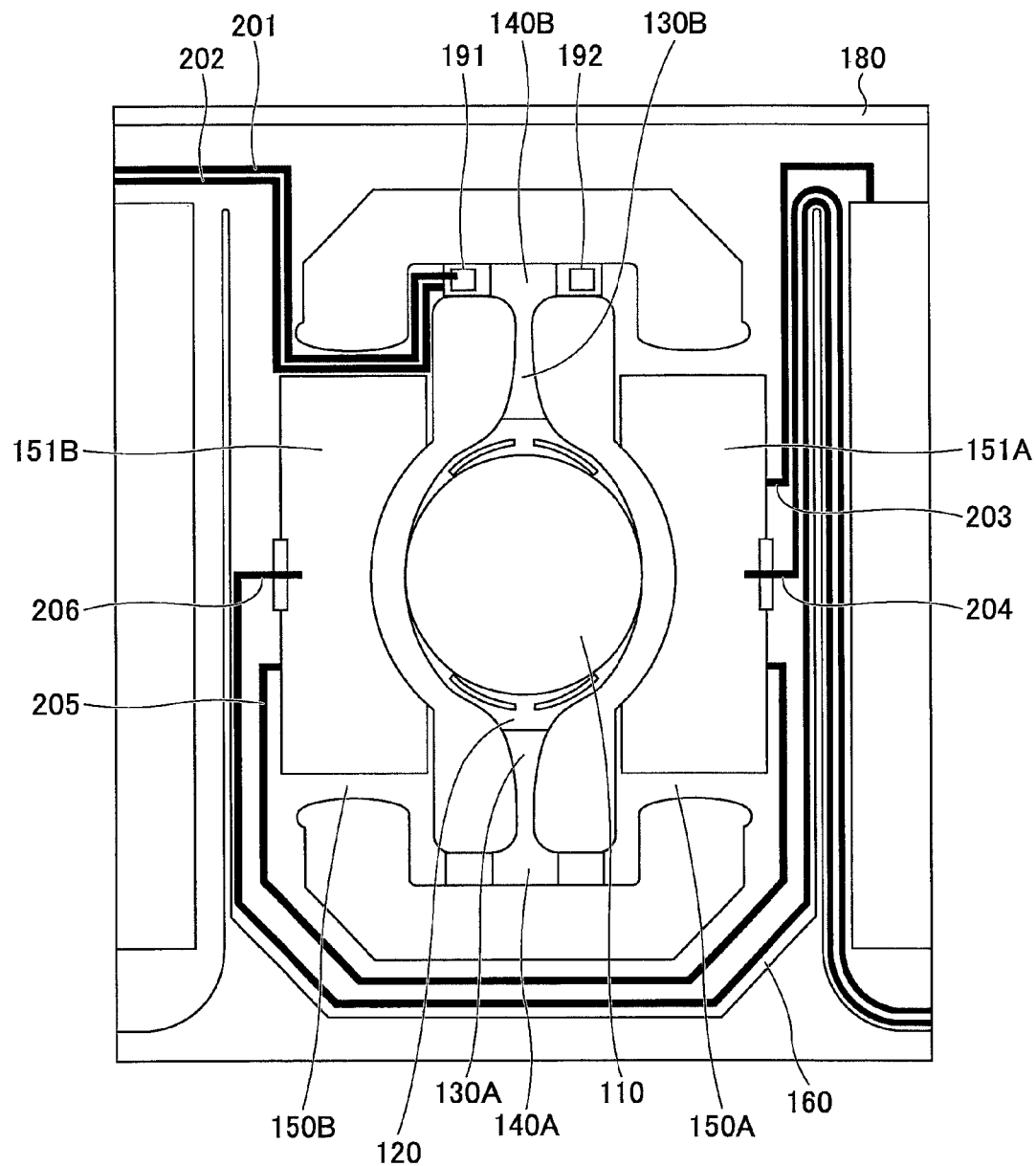
FIG. 4 is an enlarged view of a portion A of FIG. 3A.

Referring to FIG. 4, the piezoelectric sensor 191 of the first embodiment is described. FIG. 4 is an enlarged view of a portion A of FIG. 3A.

The piezoelectric sensor 191 is arranged in the connection beam 140B on a side of the drive source 151B relative to a connecting portion between the connection beam 140B and the torsion beam 130B. The piezoelectric sensor 192 is arranged in the connection beam 140B on a side of the drive source 151A relative to the connecting portion between the connection beam 140B and the torsion beam 130B.

The piezoelectric sensors 191 and 192 include the upper electrode formed on the upper surface of the piezoelectric element that is formed on the surface of the connection beam 140B and a lower electrode formed on the lower surface of the piezoelectric element.

In a case where the output of the piezoelectric sensor 191 is used, sensor wires 201 and 202 are formed only in the piezoelectric sensor 191.

The sensor wire 201 is an upper wire electrode drawn from the upper electrode of the piezoelectric sensor 191, and the sensor wire 202 is a lower wire electrode drawn from the lower electrode of the piezoelectric sensor 191.

The sensor wires 201 and 202 are formed so as to be drawn onto the side of the drive source 151B and are connected with a predetermined terminal included in a terminal group TB provided in the fixed frame 180.

Further, a drive wire 205 for applying a drive voltage to the lower electrode of the drive source 151B and a drive wire 206 for applying the drive voltage to the upper electrode of the drive source 151B are provided onto the side of the drive source 151A. The drive wire 205 is connected with the lower electrode of the drive source 151A. The drive wire 206 is arranged so as to be arranged in parallel with the drive wires 203 and 204 that apply the drive voltage to the lower and upper electrodes of the drive source 151A.

The drive wires 203, 204, 205, and 206 are connected with predetermined terminals included in the terminal group TA.

The light scanning apparatus 200 can reduce an influence of crosstalk caused in the sensor signal by the drive signal because the drive wires 203, 204, 205, and 205 are not arranged adjacent to the sensor wires 201 and 202 as structured above.

Figure 5:
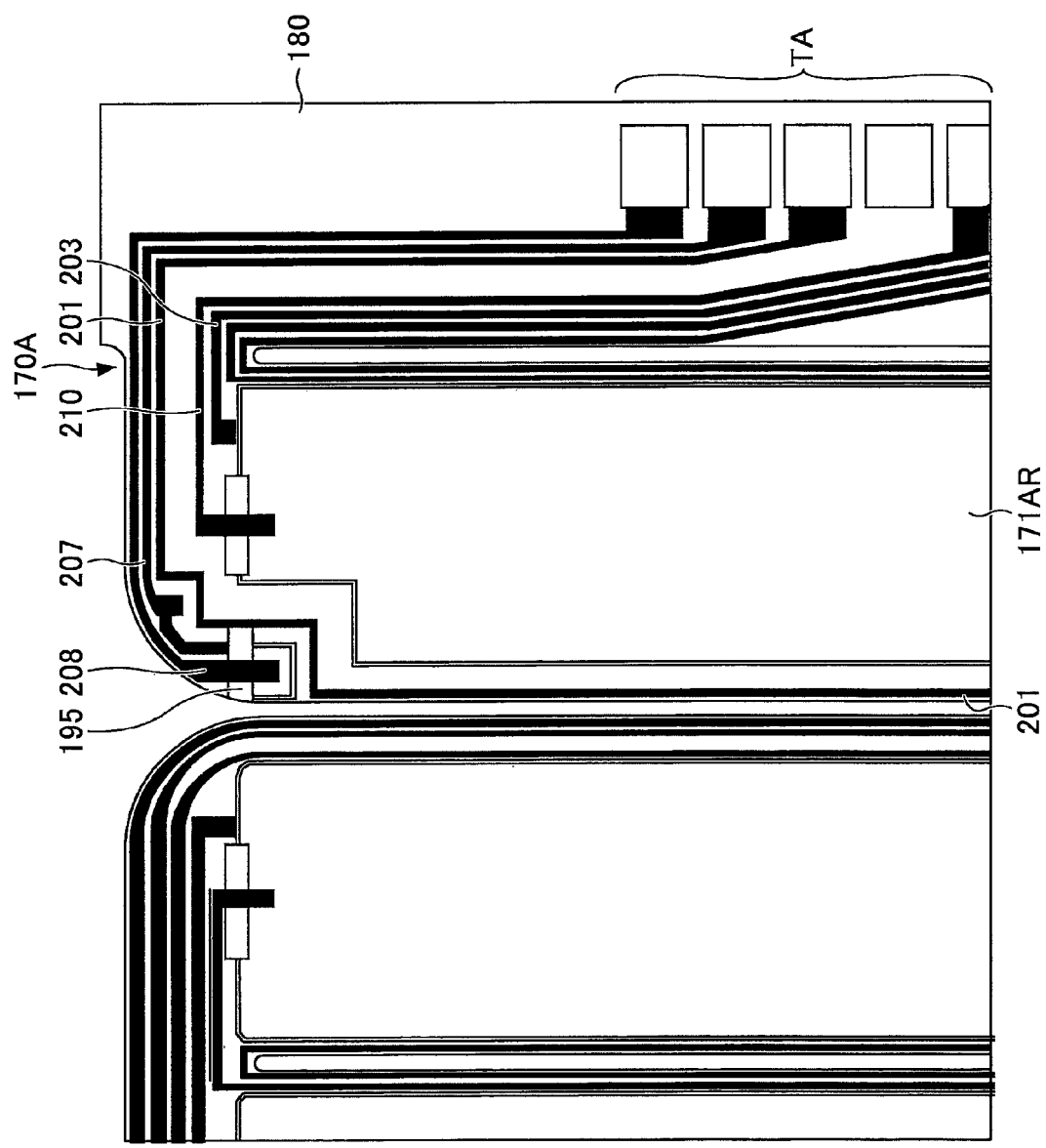
FIG. 5 is an enlarged view of a portion B of FIG. 3A.
Figure 6:
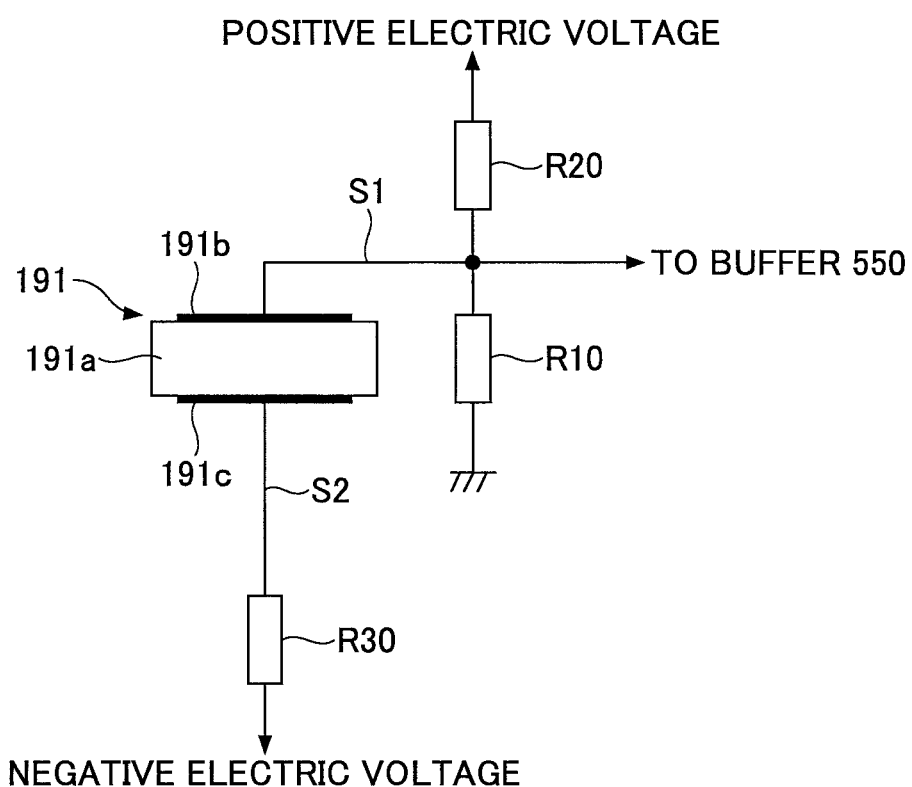
FIG. 6 illustrates generation of a bias voltage.

Referring to FIG. 5, the piezoelectric sensor 195 of the first embodiment is described. FIG. 6 is an enlarged view of a portion B of FIG. 3A.

The piezoelectric sensor 195 is provided at an upper end portion of the second drive beam 170A in the vicinity of the rectangular drive source 171DR. The piezoelectric sensor 195 includes an upper electrode that is formed on the upper surface of a piezoelectric element formed on the surface of the second drive beam 170A and a lower electrode formed on the lower surface of the piezoelectric element.

The output of the piezoelectric sensor 195 is output by the sensor wire 207 and the sensor wire 208. The sensor wire 207 is a lower wire electrode drawn from the lower electrode of the piezoelectric sensor 195, and the sensor wire 208 is a upper wire electrode drawn from the upper electrode of the piezoelectric sensor 195. The sensor wire 207 and the sensor wire 208 are connected with predetermined terminals of the terminal group TA.

Further, the sensor wires 207 and 208 are routed so as to run in parallel with a drive wire 203 for applying the drive voltage to the lower electrode of the drive source 171R and a drive wire 210 for applying the drive voltage to the upper electrode of the drive source 171R. Because the same drive voltage is applied in common to the lower electrodes of the drive sources 151A and 151B and the lower electrodes of the drive sources 171R and 171L, the drive wire 203 can be used in common to apply the drive voltage to the lower electrodes of the drive sources 151A and 151B and the lower electrodes of the drive sources 171R and 171L.

By forming the sensor wires 207 and 208 as described above, the tilt of the mirror 110 in the vertical direction can be accurately detected from the output of the piezoelectric sensor 195.

Although only the piezoelectric sensor 195 is described in FIG. 5, the piezoelectric sensor 196 is provided in an upper end portion of the second drive beam 170B in the vicinity of the rectangular drive source 171DL. The sensor wires drawn from the upper and lower electrodes of the piezoelectric sensor 196 are connected with predetermined terminals included in the terminal group TB.

Although not illustrated, the light scanning apparatus 200 includes a substrate supporting the fixed frame 180. The light scanning apparatus 200 may be connected with the sensor wires drawn from the upper electrodes of the piezoelectric sensors 195 and 196 and the sensor wires drawn from the lower electrodes of the piezoelectric sensors 195 and 196 on the substrate. Therefore, the sensor wires of the piezoelectric sensors 195 and 196 drawn from the piezoelectric sensors 195 and 196 are a pair of the upper electrodes and a pair of the lower electrodes. Within the first embodiment, it is possible to amplify the output of the sensor of detecting the swing of the mirror 110 in the vertical direction by forming the sensor wires of the piezoelectric sensors 195 and 196 as described above.

Referring back to FIG. 2, various parts of the light scanning unit 100 of the first embodiment 100 is described.

The voltage generation circuit 300 supplies power to various parts of the light scanning unit 100. Further, the voltage generation circuit 300 is connected with the resistors R20, R21, R30, and R31.

The front end IC 400 provides signal processing to the input video signal and supplies the video signal provided with the signal processing to the LD 440. Further, the front end IC 400 supplies a signal of controlling the swing of the mirror 110 to the light scanning apparatus 200.

The front end IC 400 includes a video signal processing part 410, a LD driver 420, and a mirror control part 430. The video signal processing part 410 separates a synchronized signal, a brightness signal, and a chromaticity signal from the input video signal 410 including the synchronized signal, the brightness signal, and the chromaticity signal. The video signal processing part 410 supplies the brightness signal and the chromaticity signal to the LD driver 420 and supplies the synchronized signal to the mirror control unit 430.

The LD driver 420 controls the LD 440 based on a signal output of the video signal processing part 410.

The mirror control unit 430 controls the swing of the mirror 110 based on the output of the piezoelectric sensor 191 from the mirror driver IC 500 and the synchronized signal. Specifically, the mirror control unit 430 outputs drive voltages (hereinafter, referred to as a drive signal) of the drive sources 151A, 151B, 171R, and 171L of the light scanning apparatus 200 through the mirror driver IC 500.

The mirror driver IC 500 of the first embodiment includes phase inversion parts 510 and 511, a buffer 570, and a noise removing part 600.

The phase inversion parts 510 and 511 invert the phase of the drive signal output from the mirror control unit 430. Specifically, the phase inversion part 510 inverts the phase of the drive signal supplied to the drive source 151 to generate the drive signal to be supplied to the drive source 151B. Specifically, the phase inversion part 511 inverts the phase of the drive signal supplied to the drive source 171R to generate the drive signal to be supplied to the drive source 171L.

The noise removing part 600 reduces a noise component superposed on the output of the piezoelectric sensor 191. The noise component superposed on the output of the piezoelectric sensor 191 is a crosstalk component delicately generated depending on the length of the drive wire and the gap between the wires. This noise component is received from the drive signal supplied to the drive sources 151A, 151B, 171R, and 171L.

The noise removing part 600 includes gain and phase adjust parts 520 and 530, an adding circuit 540, a buffer 550, and a subtracting circuit 560.

The gain and phase adjust parts 520 and 530 generate a component similar to the noise component superposed on the output of the piezoelectric sensor 191 using the drive signals supplied to the drive sources 151A and 151B, respectively. Hereinafter, the drive signal supplied to the drive source 151A is referred to as a drive signal 1, and the drive signal supplied to the drive source 151B is referred to as a drive source 151B.

The gain and phase adjust part 520 generates a component similar to the noise component superposed on the output of the piezoelectric sensor 191 when the drive signal 1 is applied to the drive source 151A. The gain and phase adjust part 530 generates a component similar to the noise component superposed on the output of the piezoelectric sensor 191 when the drive signal 2 is applied to the drive source 151B.

The adding circuit 540 adds the outputs of the gain and phase adjust parts 520 and 530, and inverts the result of the addition. By adding the outputs of the gain and phase adjust parts 520 and 530 and inverting the result of the addition, it is possible to generate a component similar to the noise component superposed on the output of the piezoelectric sensor 191 in a case where the drive signals 1 and 2 are simultaneously supplied to the drive sources 151A and 151B, respectively.

The buffer 550 amplifies the output of the piezoelectric sensor 191. Further, the piezoelectric sensor 191 outputs a current value corresponding to the displacement of the connection beam 140B transferred from the torsion beam 130B in conformity with the tilt angle in the horizontal directions of the mirror 110.

The subtracting circuit 560 subtracts the output of the adding circuit 540 from the output of the buffer 550. The output of the buffer 550 is a signal where the noise is superposed on the output of the piezoelectric sensor 191. Further, the output of the adding circuit 640 has a component similar to the noise component superposed on the output of the piezoelectric sensor 191. Therefore, by subtracting the output of the adding circuit 540 from the output of the buffer 550, the noise component of the output of the piezoelectric sensor 191 can be removed. The output of the subtracting circuit 560 is supplied to the mirror control unit 430 of the front end IC 400.

The buffer 570 amplifies the sensor signal obtained by adding the outputs of the piezoelectric sensors 195 and 196. Specifically, the buffer 570 is connected with the sensor wires, with which the upper electrodes of the piezoelectric sensors 195 and 196 are connected, and the sensor wires, with which the lower electrodes of the piezoelectric sensors 195 and 196 are connected.

Although it is not illustrated, the mirror driver IC 500 may include a noise removing part for removing the noise component that is received from the drive signal supplied to the drive sources 171R and 171L. The noise removing parts corresponding to the drive sources 171R and 171L have a structure similar to the noise removing part 600 and reduces the noise component superposed on the outputs of the piezoelectric sensors 195 and 196. In a case where the mirror driver IC 500 includes the noise removing part, the buffer 570 may be provided inside the noise removing part in a manner similar to the buffer 550.

The resistors R20 and R30 generate bias voltages that are supplied to the upper electrode and the lower electrode of the piezoelectric sensor 191, respectively. The resistors R21 and R31 generate bias voltages that are supplied respectively to the upper electrodes and the lower electrodes of the piezoelectric sensors 195 and 196.

Within the first embodiment, a wire S1 connects the upper electrode of the piezoelectric sensor 191 with the buffer 550 through the terminal group TB of the light scanning apparatus 200, and a wire S2 connects the lower electrode of the piezoelectric sensor 191 with the buffer 550 through the terminal group TB of the light scanning apparatus 200. Within the first embodiment, a wire S3 connects the upper electrodes of the piezoelectric sensors 195 and 196 with the buffer 570 through the terminal group TA of the light scanning apparatus 200, and a wire S4 connects the lower electrodes of the piezoelectric sensors 195 and 196 with the buffer 570 through the terminal group TA of the light scanning apparatus 200.

One end of the resistor R20 is connected to the wire S1, and the other end of the resistor R20 is applied with a positive electric voltage, which is supplied to the mirror driver IC 500 from the voltage generation circuit 300. One end of the resistor R30 is connected to the wire S2, and the other end of the resistor R30 is applied with a negative electric voltage, which is supplied to the mirror driver IC 500 from the voltage generation circuit 300.

One end of the resistor R21 is connected to the wire S3, and the other end of the resistor R21 is applied with a positive electric voltage, which is supplied to the mirror driver IC 500 from the voltage generation circuit 300. One end of the resistor R31 is connected to the wire S4, and the other end of the resistor R31 is applied with a negative electric voltage, which is supplied to the mirror driver IC 500 from the voltage generation circuit 300.

Within the first embodiment, the bias voltages applied to the upper and lower electrodes of the piezoelectric sensors are generated by connecting the resistors with the upper and lower electrodes of the piezoelectric sensors as described above.

Referring to FIG. 6, the generation of the bias voltage is described. FIG. 6 illustrates the generation of the bias voltage. Referring to FIG. 6, the bias voltage is applied to the piezoelectric sensor 191.

The piezoelectric sensor 191 includes an upper electrode 191b formed on the upper surface of a piezoelectric element (a thin film) 191a and a lower electrode 191c formed on the lower surface of the piezoelectric element 191a.

The wire S1 is connected with the upper electrode 191b, and the wire S2 is connected with the lower electrode 191c. Further, the wire S1 is connected with a connection point between a resistor R10 and the resistor R20. The resistor R10 is provided to prevent charge-up, and the other end of the resistor R10 is grounded. The other end of the resistor R20 is connected with a wire to a positive electric power supply (not illustrated) for supplying the positive electric voltage from the voltage generation circuit 300 to the mirror driver IC 500.

The wire S2 is connected with the lower electrode 191c and with one end of the resistor R30. The other end of the resistor R30 is connected with a wire to a negative electric power supply (not illustrated) for supplying the negative electric voltage from the voltage generation circuit 300 to the mirror driver IC 500.

Within the first embodiment, the positive bias voltage to be applied to the upper electrode 191b of the piezoelectric sensor 191 can be generated by providing the resistor R20 between the wire of the positive electric power supply and the upper electrode 191b of the piezoelectric sensor 191. Further, the negative bias voltage to be applied to the lower electrode 191c of the piezoelectric sensor 191 can be generated by providing the resistor R30 between the wire of the negative electric power supply and the lower electrode 191c of the piezoelectric sensor 191.

Referring to FIG. 6, the generation of the bias voltage applied to the piezoelectric sensor 191 is exemplified. Positive and negative bias voltages can be generated in a manner similar to the above in the piezoelectric sensors 195 and 196.

The direction of polarization is prevented from being inverted by applying the positive and negative bias voltages respectively to the upper and lower electrodes 191b and 191c of the piezoelectric element 191a.

The piezoelectric element 191a is a ferroelectric substance where electric dipoles are arranged. The electric dipoles (in a unit volume) existing on a surface of the ferroelectric substance show polarization by a natural separation of between a weighted center of positive electric charges and a weighted center of negative electric charges.

In a case where sensor signals alternately exerting a positive electric voltage and a negative electric voltage by applying a mechanical force to the piezoelectric element 191a without applying the bias voltage, the direction of the polarization caused by the electric dipoles in the piezoelectric elements 191a is inverted every change of the polarity of the electric voltage of the output sensor signal. Therefore, the piezoelectric element 191a degrades along a passage of time. Then, the value of the voltage output as the sensor signal becomes small.

Within the first embodiment, the polarization in the piezoelectric element 191a is maintained by applying positive and negative bias voltages to the piezoelectric element 191a thereby preventing the inversion of the polarization. This structure prevents the piezoelectric element 191a from degrading.

Figure 7B:
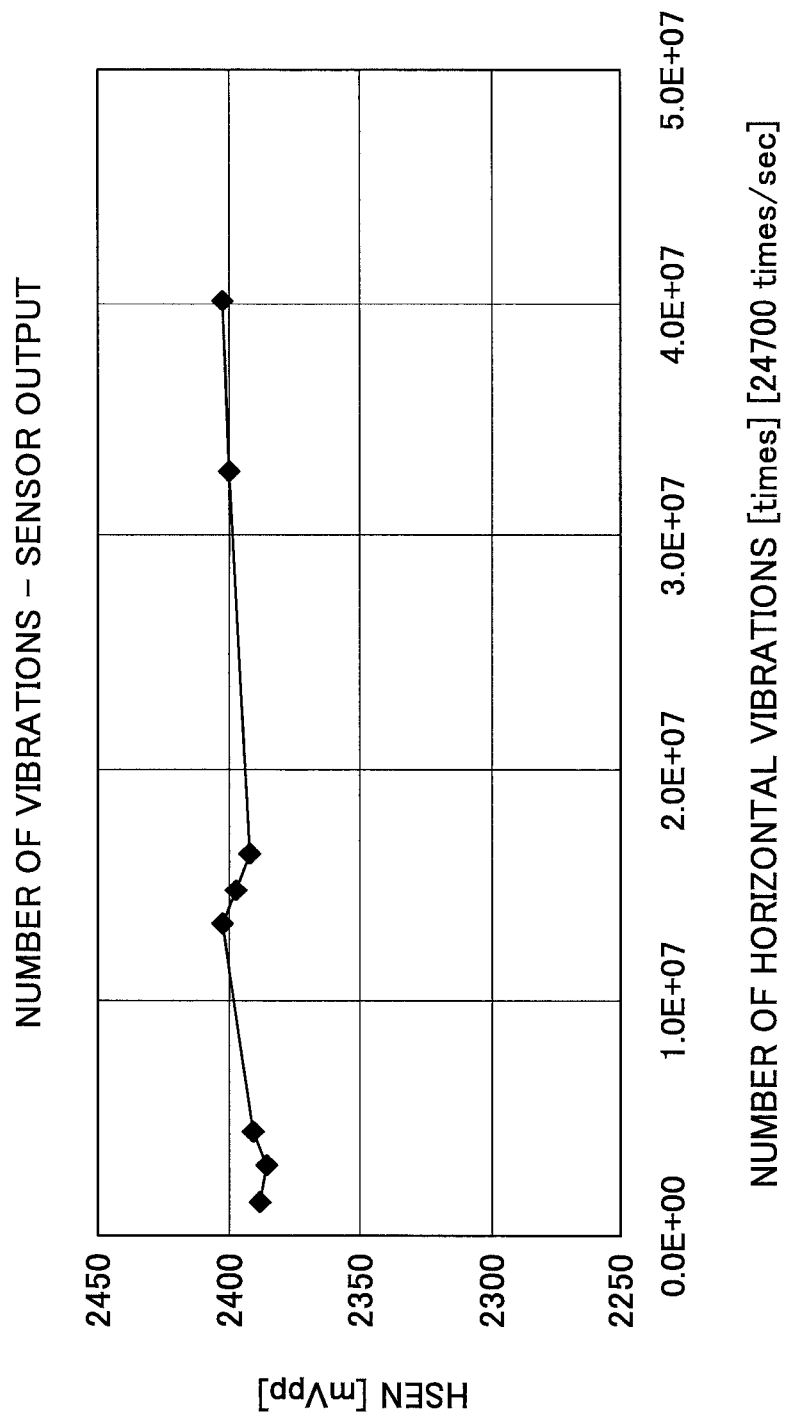
FIG. 7B illustrates aging degradation of the piezoelectric sensor.

Referring to FIGS. 7A and 7B, aging degradation of the piezoelectric sensor 191 of the first embodiment is described. FIGS. 7A and 7B illustrate the aging degradation of the piezoelectric sensor 191. FIG. 7A illustrates the aging degradation of the piezoelectric sensor 191 in a case where the bias voltage is not applied. FIG. 7B illustrates the aging degradation of the piezoelectric sensor 191 in a case where the bias voltage is applied.

The ordinate axes of FIGS. 7A and 7B indicate the voltage of the sensor signal, and the abscissa axes of FIGS. 7A and 7B indicate vibration frequencies of the piezoelectric sensor 191.

Referring to FIG. 7A, as the number of vibrations of the piezoelectric sensor 191 increases, the voltage of the sensor signal becomes reduced. On the contrary, referring to FIG. 7B, as the number of vibrations of the piezoelectric sensor 191 increases, the voltage of the sensor signal changes little. Therefore, in a case where the positive and negative bias voltages are applied, the aging degradation of the piezoelectric sensor 191 is suppressed.

Further, within the first embodiment, it is possible to increase the amplitude of the sensor signal because the applied bias voltage is superposed on the voltage generated by the displacement of the piezoelectric element 191a. If the amplitude of the sensor signal is increased, the S/N ratio of the sensor signal can be improved.

FIG. 8 illustrates sensor signals in a case where a bias voltage is applied and a case where the bias voltage is not applied.

FIG. 8 illustrates a sensor signal P1 in a case where the bias voltage is not applied, a sensor signal P2 in a case where only the positive bias voltage is applied, and a sensor signal P3 in a case where the positive and negative voltages are applied. Referring to FIG. 8, the sensor signal having the greatest amplitude is the sensor signal P3. In comparison with the sensor signal P1 where the bias voltage is not applied, the S/N ratio can be improved in the sensor signal P3.

Referring to FIGS. 6 to 8, the piezoelectric sensor 191 is exemplified. However, the positive and negative bias voltages may be applied to the piezoelectric sensors 195 and 196 in a manner similar to the piezoelectric sensor 191.

As described, according to the first embodiment, it is possible to suppress influences caused by the reduction of the output voltage by the aging degradation and the noise.

Second Embodiment

Next, a second embodiment of the present invention is described with reference to figures. The second embodiment is different from the first embodiment at a point that the resistor for generating the bias voltage is connected between the light scanning apparatus 200 and a mirror driver IC 500A. Within the second embodiment, only parts different from the first embodiment are described. Reference symbols are used for the same parts as those of the first embodiment, and description of these parts are omitted.

Figure 9:
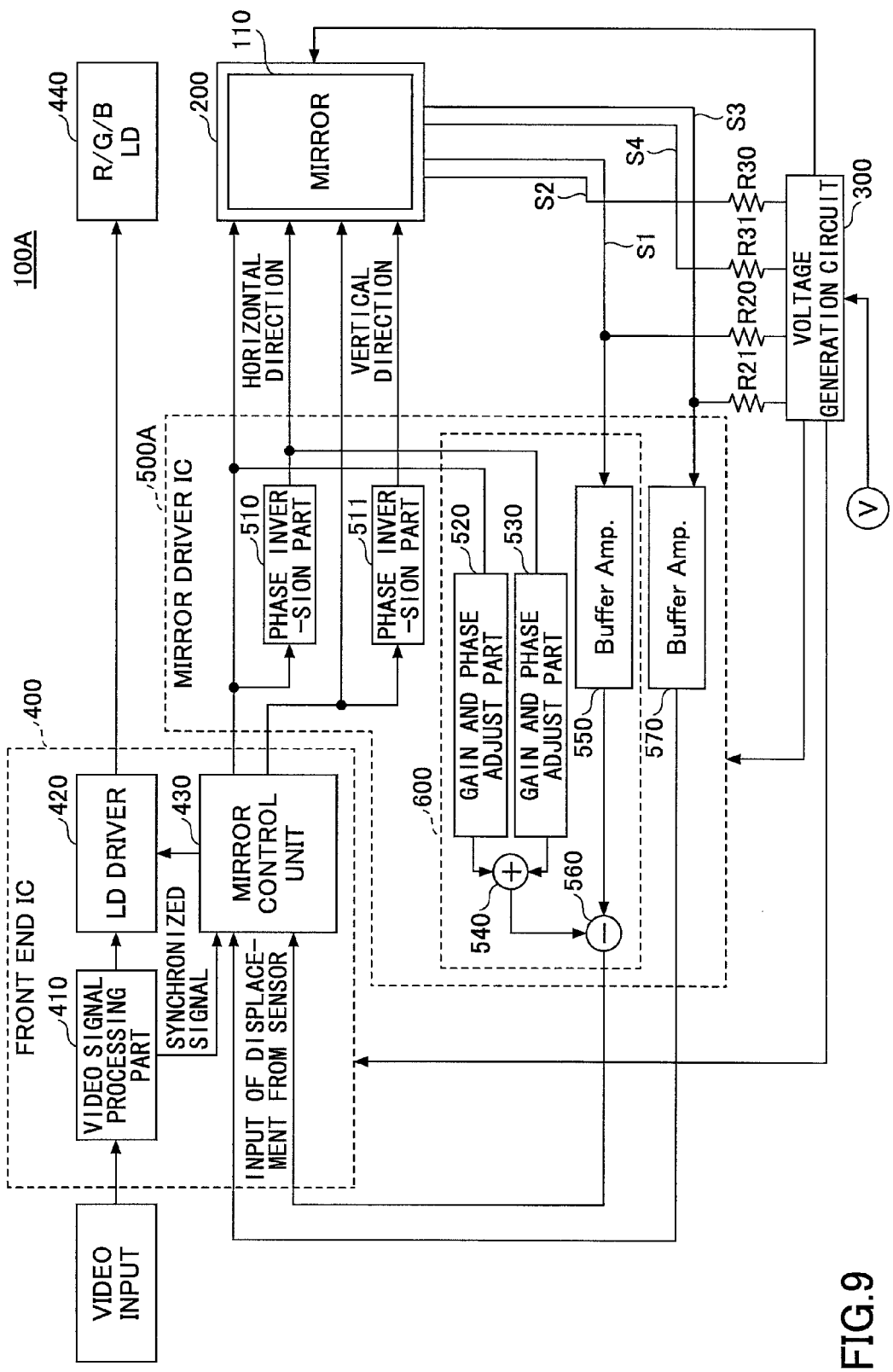
FIG. 9 illustrates a light scanning unit of a second embodiment of the present invention.

FIG. 9 illustrates a light scanning unit of the second embodiment of the present invention.

The light scanning unit 100A includes a mirror driver IC 500A. The mirror driver IC 500A of the second embodiment is different from the mirror driver IC 500 at a point that the resistors R20, R30, R21, and R31 are not included.

The resistors R20, R30, R21, and R31 are connected between the light scanning apparatus 100 and the mirror driver IC 500A.

Specifically, one end of the resistor R20 is connected with the wire S1 that is drawn from the light scanning apparatus 200 and connected with the buffer 550, and the other end of the resistor R20 is connected with the voltage generation circuit 300. One end of the resistor R30 is connected with the wire S2 drawn from the light scanning apparatus 200, and the other end of the resistor R30 is connected with the voltage generation circuit 300. One end of the resistor R21 is connected with the wire S3 that is drawn from the light scanning apparatus 200 and connected with the buffer 570, and the other end of the resistor R21 is connected with the voltage generation circuit 300. One end of the resistor R31 is connected with the wire S4 drawn from the light scanning apparatus 200, and the other end of the resistor R21 is connected with the voltage generation circuit 300.

The positive electric voltage generated by the voltage generation circuit 300 is applied to the resistors R20 and R21. The voltage applied to the resistors R20 and R21 may be the same voltage as the power source voltage supplied to, for example, the mirror driver IC 500A. The negative electric voltage generated by the voltage generation circuit 300 is applied to the resistors R30 and R31.

Within the second embodiment, it is possible to maintain the polarization in piezoelectric elements included respectively in the piezoelectric sensors 191, 195, and 196. Therefore, it is possible to prevent influences caused by a drop of the output voltage by aging degradation of the piezoelectric sensor and the noise.

Third Embodiment

Next, a third embodiment of the present invention is described in reference of figures. The third embodiment is different from the first embodiment at a point that the resistor for generating the bias voltage and the buffer for amplifying the sensor signal are provided between the light scanning apparatus 200 and a mirror driver IC 500B. Within the third embodiment, only parts different from the first embodiment are described. Reference symbols are used for the same parts as those of the first embodiment, and description of these parts are omitted.

Figure 10:
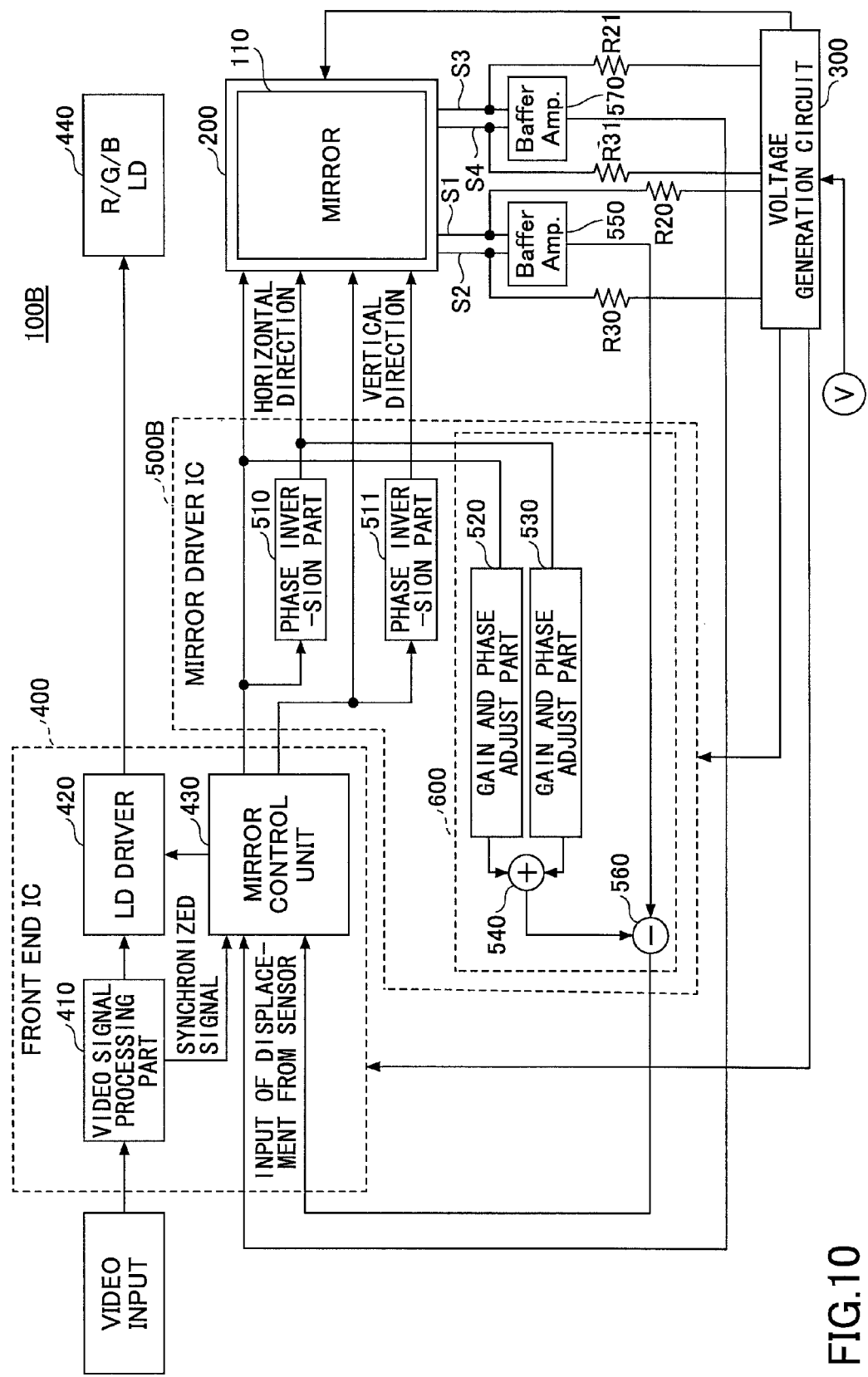
FIG. 10 illustrates a light scanning unit of a third embodiment of the present invention.

FIG. 10 illustrates a light scanning unit of the third embodiment of the present invention.

The light scanning unit 100B includes the mirror driver IC 500B. The mirror driver IC 500B of the third embodiment is different from the mirror driver IC 500 at a point that the buffers 550 and 570 and the resistors R20, R30, R21, and R31 are not included.

In the light scanning unit 100B, the wires S1 and S2 are connected with the input of the buffer 550. The output of the buffer 550 is supplied to the subtracting circuit 560. In the light scanning unit 100B, the wires S3 and S4 are connected with the input of the buffer 570. The output of the buffer 570 is supplied to the front end IC 400.

One end of the resistor R20 of the third embodiment is connected with the wire S1, and the other end of the resistor R20 of the third embodiment is applied with a positive electric voltage generated by the voltage generation circuit 300. One end of the resistor R30 is connected with the wire S2, and the other end of the resistor R30 is applied with a negative electric voltage generated by the voltage generation circuit 300. One end of the resistor R21 is connected with the wire S3, and the other end of the resistor R21 is applied with the positive electric voltage generated by the voltage generation circuit 300. One end of the resistor R31 is connected with the wire S4, and the other end of the resistor R31 is applied with the negative electric voltage generated by the voltage generation circuit 300.

Within the third embodiment, a sensor signal of the piezoelectric sensor 191 is amplified by the buffer 550 and the amplified sensor signal is supplied to the mirror driver IC 500B. Further, sensor signals are amplified by the buffer 570, and the amplified sensor signals are supplied to the front end IC 400.

Within the third embodiment, it is possible to maintain the polarization in piezoelectric elements included respectively in the piezoelectric sensors 191, 195, and 196. Therefore, it is possible to prevent influences caused by a drop of the output voltage by aging degradation of the piezoelectric sensor and the noise.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the light scanning apparatus have been described in detail, it should be understood that the various changes, substitutions, and alterations could be made hereto without departing from the spirit and scope of the invention.

What is claimed is:

1. A light scanning apparatus comprising:
   a mirror;
   a mirror supporting portion that supports the mirror;
   torsion beams that support the mirror supporting portion on opposite sides of the mirror supporting portion along an axis direction of an axis, the mirror supporting portion being swung around the axis direction by torsion of the torsion beams;
   a pair of drive beams that sandwich the mirror and the mirror supporting portion in a direction orthogonal to the axis direction;
   connection beams that connect mutually facing sides of each of the drive beams with the torsion beams; and
   a piezoelectric sensor that is formed on the connection beams and detects displacement of the connection beams, the displacement caused by swinging of the torsion beams around the axis when the mirror swings by a drive voltage applied to the drive beams,
   wherein the piezoelectric sensor includes a piezoelectric element provided inside one of the connection beams, an upper electrode formed on an upper surface of the piezoelectric element, and a lower electrode formed on a lower surface of the piezoelectric element,
   wherein a first bias voltage having a positive or negative polarity is applied to the upper electrode formed on the upper surface of the piezoelectric element at the same time that a second bias voltage having a polarity opposite to the polarity of the first bias voltage is applied to the lower electrode formed on the lower surface of the piezoelectric element, and
   wherein the light scanning apparatus comprises a drive source that includes a second piezoelectric element formed on respective surfaces of the pair of drive beams, a second upper electrode formed on an upper surface of the second piezoelectric element, and a second lower electrode formed on a lower surface of the second piezoelectric element, and that alternately applies drive voltages having different phases to the respective drive beams among the pair of drive beams so as to cause the respective drive beams to oscillate vertically in different directions, thereby causing the mirror to swing in a horizontal direction around a swing axis or a rotation axis along the torsion beams.

2. The light scanning apparatus according to claim 1, the light scanning apparatus further comprising:
   an upper electrode wire that is drawn from the upper electrode and formed on one drive beam of the pair of drive beams;
   a lower electrode wire that is drawn from the lower electrode and formed on the one drive beam of the pair of drive beams; and
   drive sources that are included in the corresponding drive beams and connected with corresponding drive wires for supplying the drive voltage,
   wherein the drive wires are drawn from the corresponding drive beams through a side of another drive beam of the pair of drive beams to an outside.

3. A light scanning control apparatus for controlling the light scanning apparatus according to claim 1, the light scanning control apparatus comprising:
   a front end circuit that processes an input signal and supplies the processed signal to a light source;
   a driver circuit that controls a supply of the drive voltage to the light scanning apparatus;
   a voltage generation circuit that supplies a power supply voltage to the front end circuit and the driver circuit;
   a first wire that is connected with an upper electrode wire drawn from the upper electrode;
   a second wire that is connected with a lower electrode wire drawn from the lower electrode;
   a buffer circuit that is connected with the first and second wires and further connected with an input terminal;
   a first voltage generation part that is connected with the first wire and generates the first bias voltage; and
   a second voltage generation part that is connected with the second wire and generates the second bias voltage.

4. The light scanning control apparatus according to claim 3,
   wherein the buffer circuit is included in the driver circuit.

5. The light scanning control apparatus according to claim 3,
   wherein the buffer circuit, the first voltage generation part, and the second voltage generation part are included in the driver circuit.

6. The light scanning control apparatus according to claim 3,
   wherein the first voltage generation part is a first resistor, one end of the first resistor being connected with the first wire and another end of the first resistor being supplied with a first voltage generated by the voltage generation circuit,
   wherein the second voltage generation part is a second resistor, one end of the second resistor being connected with the second wire and another end of the second resistor being supplied with a second voltage that has a polarity opposite to a polarity of the first voltage and is generated by the voltage generation circuit.

7. The light scanning apparatus according to claim 1, wherein the first bias voltage having the positive or negative polarity is applied to the upper electrode of the piezoelectric sensor, and the second bias voltage having the polarity opposite to the polarity of the first bias voltage is applied to the lower electrode of the piezoelectric sensor, to maintain the direction of the polarization of the piezoelectric sensor.

8. A light scanning unit comprising:
   a light scanning apparatus including
      a mirror,
      a mirror supporting portion that supports the mirror;
      torsion beams that support the mirror supporting portion on opposite sides of the mirror supporting portion along an axis direction of an axis, the mirror supporting portion being swung around the axis direction by torsion of the torsion beams, a pair of drive beams that sandwich the mirror and the mirror supporting portion in a direction orthogonal to the axis direction, connection beams that connect mutually facing sides of each of the drive beams with the torsion beams, and a piezoelectric sensor that is formed on the connection beams and detects displacement of the connection beams, the displacement caused by swinging of the torsion beams around the axis when the mirror swings by a drive voltage applied to the drive beams, wherein the piezoelectric sensor includes a piezoelectric element, an upper electrode formed on an upper surface of the piezoelectric element, and a lower electrode formed on a lower surface of the piezoelectric element, wherein a first bias voltage having a positive or negative polarity is applied to the upper electrode formed on the upper surface of the piezoelectric element at the same time that a second bias voltage having a polarity opposite to the polarity of the first bias voltage is applied to the lower electrode formed on the lower surface of the piezoelectric element;

wherein the light scanning apparatus comprises a drive source that includes a second piezoelectric element formed on respective surfaces of the pair of drive beams, a second upper electrode formed on an upper surface of the second piezoelectric element, and a second lower electrode formed on a lower surface of the second piezoelectric element, and that alternately applies drive voltages having different phases to the respective drive beams among the pair of drive beams so as to cause the respective drive beams to oscillate vertically in different directions, thereby causing the mirror to swing in a horizontal direction around a swing axis or a rotation axis along the torsion beams; and a light scanning control apparatus for controlling the light scanning apparatus including a front end circuit that processes an input signal and supplies the processed signal to a light source, a driver circuit that controls a supply of the drive voltage to the light scanning apparatus, a voltage generation circuit that supplies a power supply voltage to the front end circuit and the driver circuit;

a first wire that is connected with an upper electrode wire drawn from the upper electrode, a second wire that is connected with a lower electrode wire drawn from the lower electrode, a buffer circuit that is connected with the first and second wires and further connected with an input terminal, a first voltage generation part that is connected with the first wire and generates the first bias voltage, and a second voltage generation part that is connected with the second wire and generates the second bias voltage.

9. The light scanning unit according to claim 8, wherein the first bias voltage having the positive or negative polarity is applied to the upper electrode of the piezoelectric sensor, and the second bias voltage having the polarity opposite to the polarity of the first bias voltage is applied to the lower electrode of the piezoelectric sensor, to maintain the direction of the polarization of the piezoelectric sensor.

10. The light scanning unit according to claim 8, wherein the piezoelectric element is smaller than each of the connection beams.

11. The light scanning unit according to claim 8, wherein the first bias voltage is generated by a first resistor, one end of the first resistor being connected with the upper electrode formed on the upper surface of the piezoelectric element, and another end of the first resistor being supplied with a first voltage generated by a voltage generation circuit, and wherein the second bias voltage is generated by a second resistor, one end of the second resistor being connected with the lower electrode formed on the lower surface of the piezoelectric element, and another end of the second resistor being supplied, at the same time that the first resistor is supplied with the first voltage generated by the voltage generation circuit, with a second voltage that has a polarity opposite to a polarity of the first voltage and that is generated by the voltage generation circuit.

12. A light scanning apparatus comprising:

a mirror;

a mirror supporting portion that supports the mirror;

drive beams provided as a pair so as to sandwich a movable frame surrounding the mirror and the mirror supporting portion, the drive beams sandwiching the movable frame in a direction parallel to a rotational axis direction of the movable frame; wherein the drive beams are formed in a zigzag shape as a whole such that adjacent beams connect at ends thereof; wherein one end of the drive beams is connected to the movable frame, and another end of the drive beams is connected to the inside of a fixed frame;

a piezoelectric sensor that is formed in the vicinity of a rectangular drive source formed on the drive beams, and that detects displacement of the drive beams in a vertical direction when a drive voltage is applied by the rectangular drive source and the movable frame swings;

wherein the piezoelectric sensor includes a piezoelectric element, an upper electrode formed on an upper surface of the piezoelectric element, and a lower electrode formed on a lower surface of the piezoelectric element, wherein a first bias voltage having a positive or negative polarity is applied to the upper electrode formed on the upper surface of the piezoelectric element at the same time that a second bias voltage having a polarity opposite to the polarity of the first bias voltage is applied to the lower electrode formed on the lower surface of the piezoelectric element, wherein the light scanning apparatus comprises a drive source that includes, on a surface of the drive beams, a second piezoelectric element formed on respective adjacent rectangular drive sources, a second upper electrode formed on an upper surface of the second piezoelectric element, and a second lower electrode formed on a lower surface of the second piezoelectric element, and that applies drive voltages of different polarities between the adjacent rectangular drive sources so as to cause the adjacent rectangular drive sources to warp in different vertical directions, thereby causing the mirror to swing in a vertical direction orthogonal to a horizontal direction.

* * * * *